US008526335B2

(12) United States Patent
Muramoto et al.

(10) Patent No.: US 8,526,335 B2
(45) Date of Patent: Sep. 3, 2013

(54) PATH SETTING DEVICE AND PATH SETTING METHOD

(75) Inventors: Eiichi Muramoto, Kanagawa (JP); Naoyuki Mochida, Tokyo (JP); Ryutaro Ono, Tokyo (JP); Kazunobu Konishi, Osaka (JP)

(73) Assignee: Panasonic Corporation, Osaka (JP)

( * ) Notice: Subject to any disclaimer, the term of this patent is extended or adjusted under 35 U.S.C. 154(b) by 167 days.

(21) Appl. No.: 13/319,596

(22) PCT Filed: May 11, 2010

(86) PCT No.: PCT/JP2010/003196
§ 371 (c)(1),
(2), (4) Date: Nov. 9, 2011

(87) PCT Pub. No.: WO2010/137245
PCT Pub. Date: Dec. 2, 2010

(65) Prior Publication Data
US 2012/0063360 A1    Mar. 15, 2012

(30) Foreign Application Priority Data

May 25, 2009  (JP) ................................. 2009-125840

(51) Int. Cl.
*H04L 12/28* (2006.01)
(52) U.S. Cl.
USPC .......................................... 370/256; 370/390
(58) Field of Classification Search
USPC ................. 370/254–256, 259–261, 351, 389, 370/390, 408; 709/238, 252
See application file for complete search history.

(56) References Cited

U.S. PATENT DOCUMENTS 7,171,491 B1 *  1/2007  O'Toole et al. ............... 709/244
7,450,526 B2 * 11/2008  Yang ............................ 370/255
(Continued)

FOREIGN PATENT DOCUMENTS

| JP | 11-20501 | 1/1999 |
| JP | 2000-224165 | 8/2000 |
| JP | 2008-29771 | 2/2008 |

OTHER PUBLICATIONS

Hideto Horiuchi et al., "Proposal and Evaluation of a Network Construction Method for a Scalable P2P TV Conferencing System", IEICE Technical Report, vol. 106, No. 151, Jul. 6, 2006, pp. 1 to 6.
Shun Higashine et al., "A Proposal of a Plural Tree Generation Algorithm for Distance Classes by Application Level Multicast Communication", IEICE Technical Report, vol. 105, No. 195, Jul. 14, 2005, pp. 9 to 12.

(Continued)

*Primary Examiner* — Frank Duong
(74) *Attorney, Agent, or Firm* — Greenblum & Bernstein, P.L.C.

(57) ABSTRACT

Disclosed is a path setting device capable of setting a distribution path of packets more speedily, when the originator of information is switched. The terminal (100) as the device sets the distribution path of the packets to a communication network which distributes the information from an unspecified terminal to a large number of terminals by transferring the packets. The terminal (100) comprises: an expanded distribution tree calculation unit (140) which calculates the distribution path in accordance with the position, on the communication network, of an origination candidate terminal which is a terminal capable of originating information; and a table setting server unit (150) which sets the calculated distribution path to the communication network. The distribution path calculated by the expanded distribution tree calculation unit (140) comprises: a distribution tree to transfer the packets from a root terminal to the large number of terminals; and a connection tree path to transfer the packets from the origination candidate terminal to the root terminal.

9 Claims, 15 Drawing Sheets

(56) References Cited

U.S. PATENT DOCUMENTS

| | | | |
|---|---|---|---|
| 7,760,659 B2* | 7/2010 | Luo et al. | 370/252 |
| 7,778,273 B2* | 8/2010 | Luo et al. | 370/465 |
| 8,243,630 B2* | 8/2012 | Luo et al. | 370/261 |
| 2010/0238925 A1* | 9/2010 | Karuppiah | 370/390 |
| 2011/0002333 A1* | 1/2011 | Karuppiah et al. | 370/390 |

OTHER PUBLICATIONS

Kazuyuki Shudo, "P2P Architecture Application-so Multicast; Kihon to Oyo", UNIX magazine, vol. 21, No. 6, Oct. 1, 2006, pp. 34 to 43.

* cited by examiner

| TRANSMISSION SOURCE IP ADDRESS | DESTINATION IP ADDRESS | DESTINATION PORT NUMBER | NEXT HOP IP ADDRESS | DESTINATION PORT NUMBER |
|---|---|---|---|---|
| aa.aa.aa.aa | bb.bb.bb.bb | xxxx | cc.cc.cc.cc | xxxxx |
| aa.aa.aa.aa | bb.bb.bb.bb | xxxx | dd.dd.dd.dd | xxxxx |
| ee.ee.ee.ee | ff.ff.ff.ff | yyyy | gg.gg.gg.gg | yyyy |
| ee.ee.ee.ee | ff.ff.ff.ff | yyyy | hh.hh.hh.hh | yyyy |
| ii.ii.ii.ii | jj.jj.jj.jj | xxxx | kk.kk.kk.kk | yyyy |
| ii.ii.ii.ii | jj.jj.jj.jj | xxxx | ll.ll.ll.ll | yyyy |
| ... | ... | ... | ... | ... |

FIG.3

PATH SETTING DEVICE AND PATH SETTING METHOD

TECHNICAL FIELD

The present invention relates to a path setting apparatus and path setting method that set a packet distribution path for a communication network that distributes information to a plurality of terminals by means of packet duplication and transfer.

BACKGROUND ART

When a teleconferencing system or remote lecture system is implemented using a communication network, it is necessary for the same information to be distributed from an unspecified terminal to a plurality of terminals (hereinafter referred to as "multipoint communication"). For example, in the case of a remote lecture, an unspecified student asks a question to a lecturer. Consequently, a remote lecture system must distribute not only a lecturer's speech information but also speech information of a student asking a question to a plurality of remote lecture participants.

IP (internet protocol) multicasting is known as a technology that implements multipoint communication. However, with IP multicasting it is necessary for all routers in a communication network to support IP multicasting. Therefore, it is difficult for IP multicasting to be applied to an existing or general-purpose communication network such as the Internet. That is to say, with IP multicasting it is difficult to implement multipoint communication cheaply and flexibly.

ALM (application layer multicast) is known as another technology that implements multipoint communication. ALM is one kind of overlay multicasting. ALM is a technology whereby the same information is distributed to a plurality of terminals by having each terminal duplicate a received packet and transfer it to another terminal in accordance with a predetermined distribution path. Since packet duplication and transfer is controlled in the application layer, ALM is easily applied to an existing or general-purpose communication network.

CITATION LIST

Patent Literature

PTL 1
Japanese Patent Application Laid-Open No. 2000-224165

SUMMARY OF INVENTION

Technical Problem

With ALM, it is necessary to decide a packet distribution path prior to information distribution. Moreover, with ALM, it is necessary for a transfer table for performing packet transfer in accordance with a distribution path to be set in each terminal. An ALM distribution path has a distribution tree configuration so that a packet is transmitted efficiently to a plurality of terminals. A distribution tree is a distribution path that branches, with a terminal that originates information (hereinafter also referred to as "originator") as a root.

However, in the case of multipoint communication, a considerable amount of time is required until information distribution actually becomes possible after an originator switching decision is made, which may be a hindrance to teleconferencing. This is because, in multipoint communication a distribution tree that is to be set differs for each originator, and therefore it is necessary for a distribution tree to be re-set for all terminals each time an originator changes.

The reason why distribution tree switching takes time is as follows. Distribution tree settings are broadly divided into three processes. The first process is a process of measuring metric information. The second process is a process of calculating a distribution tree in accordance with measured metric information. The third process is a process of generating a transfer table for each terminal based on a calculated distribution tree, and setting the transfer tables in each terminal (hereinafter referred to as "setting a distribution tree"). Metric information includes an inter-terminal band and round trip time (RTT).

The time required for the first process and the time required for the third process increase in proportion to the number of terminals participating in a multipoint communication session (hereinafter referred to as "participating terminals"). Also, since inter-terminal transfer combination patterns increase exponentially relative to the number of participating terminals, the second process requires an enormous amount of time when there are a plurality of terminals. The complexity of distribution tree calculation is generally known as NP-hard.

The way in which distribution tree switching is performed in multipoint communication, and problems involved therein, will be described here using a drawing, taking a case in which ALM is applied to a remote lecture as an example.

FIG. 1 is a schematic diagram showing an example of the general outline of a remote lecture system.

In FIG. 1, remote lecture system 10 forms a communication network in which a plurality of terminals 20 are located. Each terminal 20 is provided with a display and a camera. Here, first terminal 20-1 inputs video and speech of lecturer 31, and second terminal 20-2 inputs video and speech of questioner 32.

When lecturer 31 is speaking, audio/video of lecturer 31 is duplicated and transferred by each terminal 20 in accordance with first distribution tree 41 (dotted-line arrows in the drawing) having first terminal 20-1 as its root. As a result, audio/video of lecturer 31 is distributed, for example, to third terminal 20-3, and output by third terminal 20-3.

Here, it is assumed that questioner 32 origination has been started. In this case, a server terminal (for example, first terminal 20-1) that performs distribution tree switching for the communication network calculates second distribution tree 42 (solid-line arrows in the drawing) having second terminal 20-2 as its root. Then the server terminal generates all per-terminal transfer tables, and reports the generated transfer tables to, and sets them in, the terminals. As a result, audio/video output by third terminal 20-3, for example, is switched from lecturer 31 audio/video to questioner 32 audio/video.

As stated above, this process takes a considerable amount of time. Therefore, a comparatively long time is required until questioner 32 can actually ask a question after it is decided that questioner 32 is to ask a question. The same kind of problem also arises when questioner switching is performed. Thus, if such time is required each time an originator is switched, this may hinder the progress of a teleconference.

It is therefore an object of the present invention to provide a path setting apparatus and path setting method that enable a packet distribution path to be set in a shorter time when an information transmission source is switched.

Solution to Problem

A path setting apparatus of the present invention sets a packet distribution path for a communication network that distributes information from an unspecified terminal to a plurality of terminals by means of packet transfer, and has a distribution path calculation section that calculates the distribution path according to a location in the communication network of an origination candidate terminal that is a terminal capable of originating information, and a path setting section that sets a calculated distribution path for the communication network; and, with this path setting apparatus, the distribution path calculated by the distribution path calculation section comprises a distribution tree that transfers a packet from a root terminal to the plurality of terminals, and a connection tree path that transfers a packet from the origination candidate terminal to the root terminal.

A path setting method of the present invention sets a packet distribution path for a communication network that distributes information from an unspecified terminal to a plurality of terminals by means of packet transfer, and has a step of calculating the distribution path according to a location in the communication network of an origination candidate terminal that is a terminal capable of originating information, and a step of setting a calculated distribution path for the communication network; and, with this path setting method, the distribution path comprises a distribution tree that transfers a packet from a root terminal to the plurality of terminals, and a connection tree path that transfers a packet from the origination candidate terminal to the root terminal.

Advantageous Effects of Invention

The present invention enables a packet distribution path to be set in a shorter time when an information transmission source is switched.

BRIEF DESCRIPTION OF DRAWINGS

FIG. 3 is a drawing showing an example of the contents of a transfer table in this embodiment;

DESCRIPTION OF EMBODIMENT

Now, an embodiment of the present invention will be described in detail with reference to the accompanying drawings.

Figure 2:
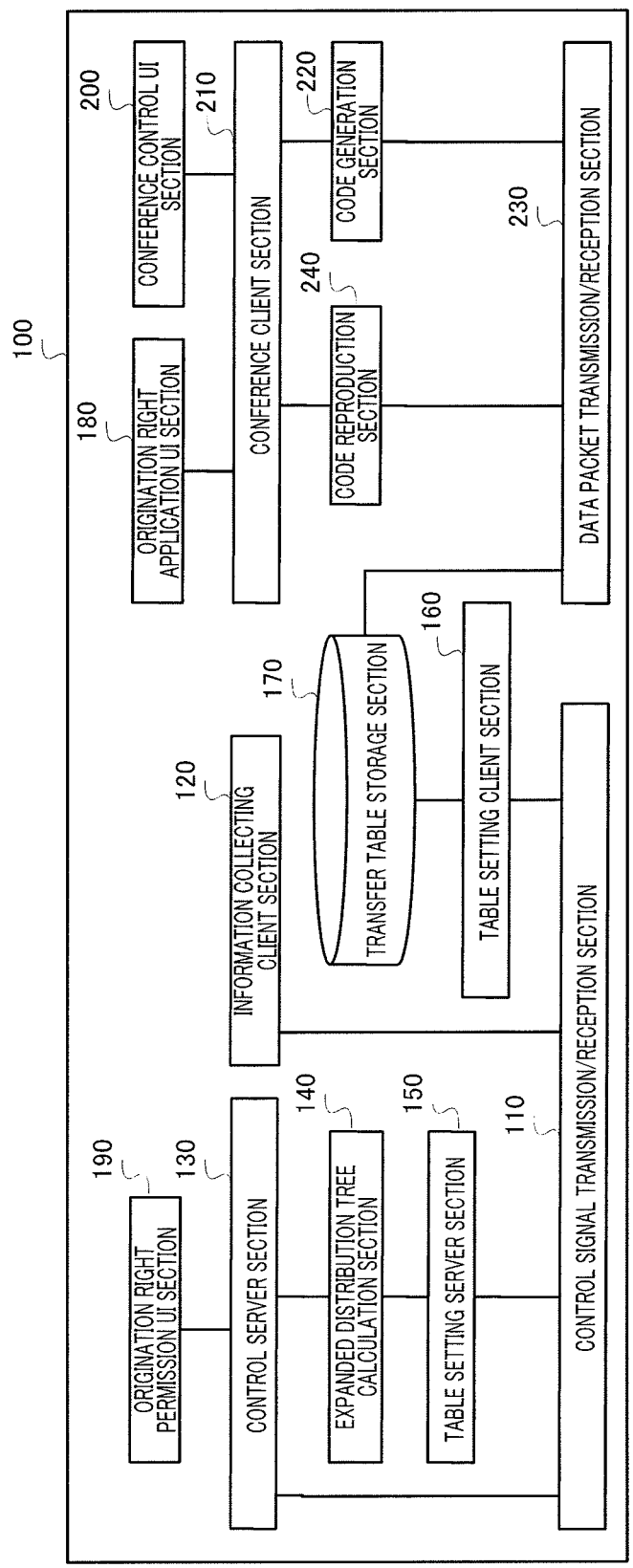
FIG. 2 is a block diagram showing a configuration of a terminal that includes a path setting apparatus according to an embodiment of the present invention.

FIG. 2 is a block diagram showing a configuration of a terminal that includes a path setting apparatus according to an embodiment of the present invention. This embodiment is an example of application of the present invention to terminals composing a communication network for performing teleconferencing.

Figure 1:
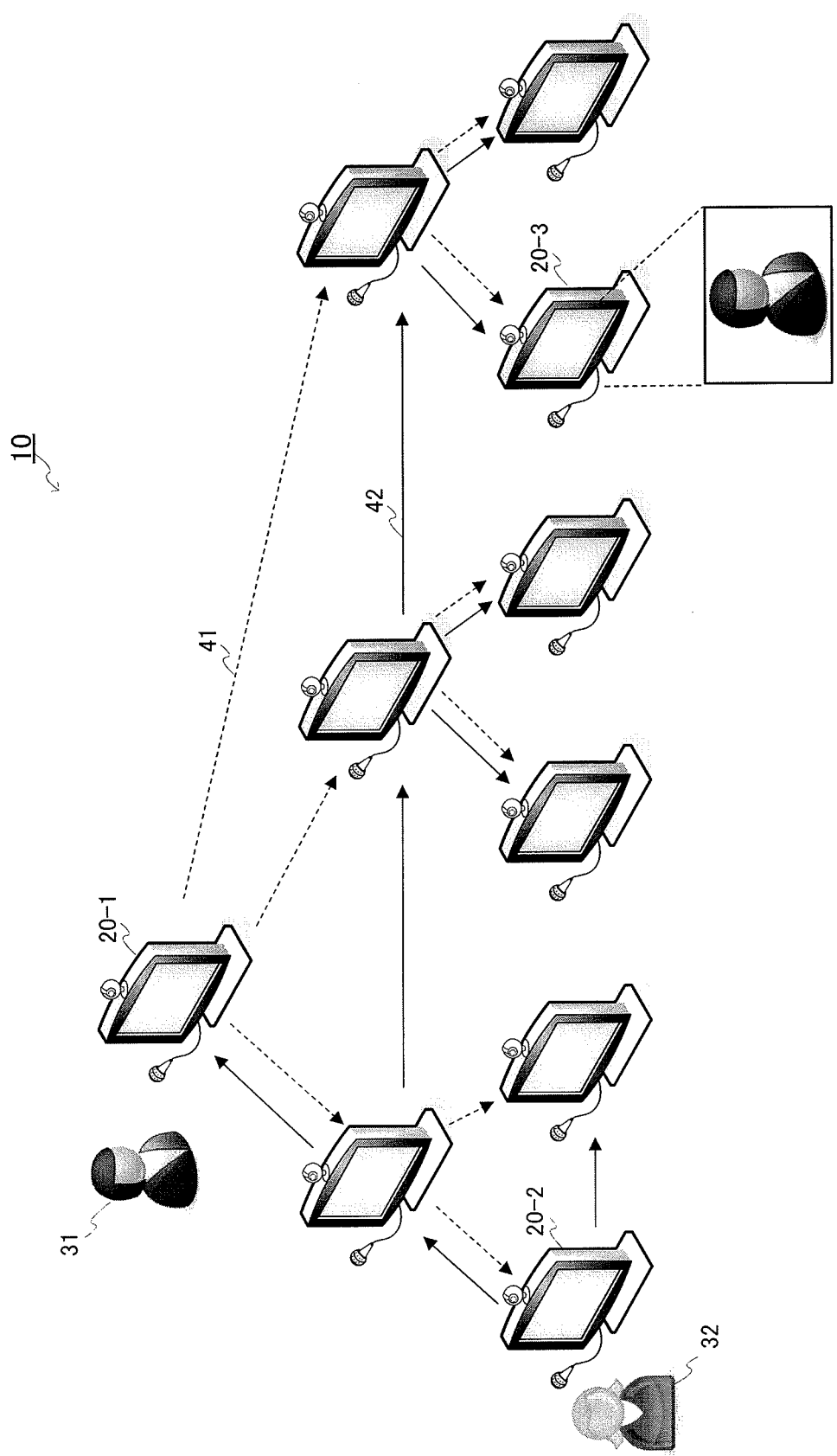
FIG. 1 is a schematic diagram showing an example of the general outline of a remote lecture system employing ALM.

A communication network comprising terminals according to this embodiment has the kind of layout shown in FIG. 1, for example. All the terminals in the communication network have the configuration described below. However, it is assumed that a server terminal having a function of controlling an audio/video distribution path in the communication network, and a terminal that receives control from this server terminal, are decided beforehand.

In the following description, a terminal that receives server terminal control is referred to as a "client terminal," and a server terminal and client terminal in a communication network are referred to generically as "participating terminals." IP addresses of all participating terminals are registered in a server terminal. Each participating terminal can transmit and receive control signals to/from all other participating terminals independently of an audio/video distribution path controlled by a server terminal.

In FIG. 2, terminal 100 has control signal transmission/reception section 110, information collecting client section 120, control server section 130, expanded distribution tree calculation section 140, table setting server section 150, table setting client section 160, transfer table storage section 170, origination right application UI (user interface) section 180, origination right permission UI section 190, conference control UI section 200, conference client section 210, code generation section 220, data packet transmission/reception section 230, and code reproduction section 240.

When functioning as a server terminal, terminal 100 executes processing of a phase of setting a distribution tree for a communication network, and processing of a phase of receiving an origination request from a client terminal.

When functioning as a client terminal, terminal 100 executes processing of a phase of receiving a distribution tree setting from a server terminal, and processing of a phase of issuing an origination request to a server terminal. Also, when functioning as a client terminal, terminal 100 executes processing of a phase of performing information distribution after an origination request has been received.

To simplify the following description, terminology will be defined here as follows.

Operation of terminal 100 as a server terminal in a phase of setting a distribution tree in a communication network is referred to as "distribution tree setting server operation."

Operation of terminal 100 as a server terminal in a phase of receiving an origination request from a client terminal is referred to as "origination request server operation."

Operation of terminal 100 as a client terminal in a phase of receiving a distribution tree setting from a server terminal is referred to as "distribution tree setting client operation."

Operation of terminal 100 as a client terminal in a phase of issuing an origination request to a server terminal is referred to as "origination request client operation."

Operation of terminal 100 as a client terminal that performs information distribution in origination request client operation is referred to as "information distribution operation."

A participating terminal capable of issuing an origination request is referred to as an "origination candidate terminal." A participating terminal that actually issues an origination request is referred to as an "origination requesting terminal."

A participating terminal for which an origination request is approved and that is capable of performing audio/video origination is referred to as an "originating terminal."

There are as many distribution trees having an origination candidate terminal as a root as there are origination candidate terminals. A distribution tree representing these distribution trees is referred to as a "representative distribution tree."

A participating terminal located at the root of a representative distribution tree is referred to as a "root terminal."

A distribution path from an origination requesting terminal that is not a root terminal to a nearby root terminal is referred to as a "connection tree path."

A distribution path combining a representative distribution tree and a connection tree path is referred to as an "expanded distribution tree."

What kind of distribution tree is made a representative distribution tree, and which root terminal each origination requesting terminal is connected to by a connection tree path will be described later herein.

The functions of the respective sections will now be described, divided into the above operations.

First, functions common to all operations will be described.

Control signal transmission/reception section 110 performs transmission and reception of control information relating to call control and various control signals relating to distribution tree control to/from other participating terminals. Call control includes control for call establishment, participation, disconnection, termination, and so forth. Each section of terminal 100 performs communication other than audio/video data communication with another participating terminal via control signal transmission/reception section 110.

The function of each section in distribution tree setting client operation will now be described.

Information collecting client section 120 returns full-mesh metric information according to a request from control server section 130. More specifically, information collecting client section 120 measures a band and round trip time vis-a-vis all other participating terminals Then information collecting client section 120 transmits the measurement results to control server section 130 as metric information.

A Packet Train method or Packet Pair method, for example, can be used as a band and round trip time measurement method. In a Packet Pair method, a round trip time is measured from the arrival interval aperture of two measurement packets—that is, the difference between a measurement packet transmission time and arrival time—and a band is estimated. In a Packet Train method, an available band is estimated from differences in arrival time of a plurality of test packets.

Table setting client section 160 receives a transfer table described later herein from a server terminal, and stores the received transfer table in transfer table storage section 170 described later herein. Alternatively, table setting client section 160 updates a transfer table already stored in transfer table storage section 170 with a transfer table received from a server terminal.

Transfer table storage section 170 stores a transfer table that is used by data packet transmission/reception section 230 described later herein.

The function of each section in distribution tree setting server operation will now be described.

Control server section 130 issues a request for the above metric information to information collecting client section 120 of all client terminals in the communication network, and collects metric information. Then control server section 130 outputs collected metric information to expanded distribution tree calculation section 140, and directs distribution tree calculation and representative distribution tree selection. Here, distribution tree calculation is calculation of distribution trees with all origination candidate terminals as a root, and representative distribution tree selection is selection of a representative distribution tree from among the calculated distribution trees. Control server section 130 also directs expanded distribution tree calculation section 140 to calculate a connection tree path from an originating terminal to a representative distribution tree, and to calculate an expanded distribution tree for each originating terminal.

Based on metric information input from control server section 130, expanded distribution tree calculation section 140 calculates a distribution tree with an origination candidate terminal as a root terminal for all origination candidate terminals. Then expanded distribution tree calculation section 140 selects a representative distribution tree from among the calculated distribution trees. The distribution tree calculation method and representative tree selection method will be described later herein.

Furthermore, expanded distribution tree calculation section 140 calculates which representative distribution tree should be used when each origination candidate terminal becomes an originating terminal. Expanded distribution tree calculation section 140 also calculates a connection tree path from each origination candidate terminal to a root terminal of a representative distribution tree that should be used. That is to say, expanded distribution tree calculation section 140 calculates an expanded distribution tree for each origination candidate terminal. Then expanded distribution tree calculation section 140 outputs calculated expanded distribution trees to table setting server section 150.

Table setting server section 150 converts all expanded distribution trees input from expanded distribution tree calculation section 140 to transfer tables of all participating terminals. Then table setting server section 150 sets each transfer table generated by the conversion in a corresponding participating terminal. Here, since a plurality of expanded distribution trees are generated in correspondence to a plurality of origination candidate terminals, individual transfer tables have contents corresponding to a plurality of expanded distribution trees. Expanded distribution tree differentiation in a transfer table is performed by means of differentiation of a group comprising a data packet transmission source IP address, destination IP address, and destination port number.

FIG. 3 is a drawing showing an example of transfer table contents.

As shown in FIG. 3, transfer table 310 contains a group comprising next hop IP address 314 and destination port number 315 associated with a group comprising transmission source IP address 311, destination IP address 312, and destination port number 313.

In a part corresponding to a connection tree path, table setting server section 150 enters an IP address of a root terminal that is not terminal 100 to which this transfer table 310 is assigned in destination IP address 312. Also, table setting server section 150 enters a predetermined port number indicating a connection tree path (hereinafter referred to as "connection port number") in destination port numbers 313 and 315. Furthermore, table setting server section 150 enters an IP address of a next transfer destination participating terminal in a connection tree path in next hop IP address 314.

In a part corresponding to a distribution tree, table setting server section 150 enters an IP address of a root terminal in transmission source IP address 311. Also, table setting server section 150 enters a predetermined port number indicating a distribution tree (hereinafter referred to as "distribution tree port number") in destination port numbers 313 and 315. Furthermore, table setting server section 150 enters an IP address of a next transfer destination participating terminal in a distribution tree in next hop IP address 314.

In a part corresponding to transfer from a connection tree path to a distribution tree (that is, a part corresponding to a function as a root terminal), table setting server section 150 enters an IP address of a root terminal in destination IP address 312. Also, table setting server section 150 enters a connection tree port number in destination port number 313. Furthermore, table setting server section 150 enters an IP address of a next transfer destination participating terminal in a distribution tree in next hop IP address 314, and enters a distribution tree port number in destination port number 315.

Here, it is assumed that "xxxx" is a connection tree port number and "yyyy" is a distribution tree port number. In this case, in transfer table 310, first line 316 corresponds to a connection tree path, second line 317 corresponds to a distribution tree, and third line 318 corresponds to transfer from a connection tree path to a distribution tree. A connection port number and distribution tree port number are, for example, common values set beforehand in the communication network.

By using transfer table 310 of this kind, each participating terminal can transfer a data packet received from an originating terminal in accordance with a connection tree path or distribution tree calculated for that originating terminal. Also, since data packet destination port number reassignment is performed by each root terminal, the communication network can transfer a data packet in accordance with an expanded distribution tree.

That is to say, an originating terminal need only enter a root terminal IP address in a destination IP address and enter a connection tree port number in a destination port number. By this means, an originating terminal can distribute a transmission packet to all participating terminals in accordance with an expanded distribution tree.

A root terminal IP address that should be used by an originating terminal is here assumed to be reported from a server terminal by means of an above origination permission message. Provision may also be made for a server terminal to report a connection tree port number and distribution tree port number by means of an origination permission message.

The function of each section in origination request client operation will now be described.

Origination right application UI section 180 receives origination request input from a terminal 100 user. This origination request input is performed, for example, via a remote control, keyboard, mouse, or suchlike operation input apparatus (not shown) belonging to terminal 100. More specifically, origination request input is performed, for example, by a mouse button being clicked while a pointer is pointing to a predetermined area on a display screen. When an origination request is input, origination right application UI section 180 reports the fact to conference client section 210.

Conference control UI section 200 inputs terminal 100 user video and speech. This video and speech input is performed, for example, via input apparatuses such as a camera and microphone (not shown) belonging to terminal 100. Then conference control UI section 200 generates a refresh screen from input video and speech, and outputs this to conference client section 210 as audio/video. Also, conference control UI section 200 outputs audio/video of another participating terminal input from conference client section 210 to a terminal 100 user. This audio/video output is performed, for example, by means of information output apparatuses such as a display and loudspeaker (not shown) belonging to terminal 100.

On receiving a report that an origination request has been input, conference client section 210 generates an origination request message requesting distribution of user audio/video, and distributes the generated origination request message to a server terminal. An origination request message includes at least a terminal 100 IP address.

On receiving an origination permission message, conference client section 210 reports the fact to the user, using conference control UI section 200. Also, conference client section 210 sets a root terminal IP address included in the origination permission message in code generation section 220 as an information-distribution-time destination.

The function of each section in origination request server operation will now be described.

When an origination request message is received from a client terminal, control server section 130 uses origination right permission UI section 190 to accept the origination request and acquire from the user a determination of whether or not origination is to be permitted. Specifically, on receiving an origination request message, control server section 130 reports origination request message transmission source identification information to origination right permission UI section 190. Then control server section 130 receives a report as to whether or not the origination request is to be approved as a response to the identification information report.

An origination request message is a message requesting that distribution of user audio/video be performed, and comprises information that includes at least a transmission source IP address. That is to say, an origination request message transmission source is an origination requesting terminal.

When origination from an origination requesting terminal is permitted, control server section 130 transmits an origination permission message to that origination requesting terminal. An origination permission message is a message that reports that origination has been permitted, and also directs that a data packet is to be transmitted to a root terminal of a representative distribution tree calculated by expanded distribution tree calculation section 140.

Which root terminal each origination requesting terminal transmits a data packet to as a destination is decided based on a transfer table set in that origination requesting terminal. When origination is not permitted, control server section 130 may report that origination has been permitted based on the fact that an origination permission message is not returned within a predetermined time. Also, when origination is not permitted, control server section 130 may transmit an origination non-permission message indicating that origination has not been permitted.

When origination requesting terminal identification information is reported from control server section 130, origination right permission UI section 190 receives input concerning an origination request decision from a terminal 100 user via an above-described operation input apparatus. Origination right permission UI section 190 reports an input origination request decision to control server section 130. If an origination request is approved, control server section 130 transmits an origination permission message to the origination requesting terminal as described above. This report is given, for example, by displaying origination requesting terminal identification information on a display screen. Also, this decision input is performed by a mouse button being clicked while a predetermined area on the display screen is being indicated by a pointer.

The function of each section in information distribution operation will now be described.

Conference client section 210 directs code generation section 220 to start encoding of user audio/video input, and perform network output of input audio/video via data packet transmission/reception section 230. Also, conference client section 210 directs code reproduction section 240 to decode an audio/video data packet received via data packet transmission/reception section 230, and output decoded audio/video to conference control UI section 200.

Code generation section 220 performs predetermined encoding processing including compression processing on audio/video. Specifically, code generation section 220 stores audio/video, and generates a data packet with a terminal 100 IP address as a transmission source IP address, a set information-distribution-time destination as a destination IP address, and a connection port number as a destination port number. Then code generation section 220 outputs the generated data packet to data packet transmission/reception section 230.

Data packet transmission/reception section 230 transfers a packet including audio/video (hereinafter referred to as "data packet") from code generation section 220, and a data packet received from another participating terminal. Specifically, data packet transmission/reception section 230 transfers a data packet received from another participating terminal to its own code reproduction section 240 and another participating terminal in accordance with a transfer table (see FIG. 3) stored in transfer table storage section 170. At this time, data packet transmission/reception section 230 also performs reassignment of a data packet destination port number as appropriate. Data packet transfer to another participating terminal can be expressed as data packet duplication.

As explained above, a transfer table has contents corresponding to an expanded distribution tree of each origination requesting terminal. Therefore, data packet transmission/reception section 230 transfers a data packet sent from code generation section 220 or another participating terminal with a specific port as a destination to its own code reproduction section 240 and the next participating terminal in a decided expanded distribution tree.

Code reproduction section 240 performs predetermined decoding processing including expansion processing on audio/video.

Terminal 100 can be implemented, for example, using a CPU (central processing unit), a storage medium such as ROM (read only memory) that stores a control program, working memory such as RAM (random access memory), and a communication circuit. In this case, the functions of the above sections are implemented by execution of the control program by the CPU.

When functioning as a server terminal, terminal 100 having this kind of configuration can set an expanded distribution tree for each origination candidate terminal in a communication network beforehand, using a representative distribution tree. Also, when functioning as a client terminal, terminal 100 having this kind of configuration can perform information origination and duplication and transfer using a set expanded distribution tree.

Therefore, in a communication network comprising terminals 100, it is not necessary for an expanded distribution tree to be calculated as a distribution path each time an originating terminal is switched, enabling an expanded distribution tree to be set as a distribution path in a shorter time. A communication network comprising terminals 100 is referred to below as a "communication network according to this embodiment."

In a communication network according to this embodiment, an expanded distribution tree is not set for all participating terminals, but only for an origination candidate terminal, enabling the expanded distribution tree calculation time to be shortened.

When m simultaneously originating participating terminals are selected from among n participating terminals, the number of combinations is $nCm=n!/\{m!*(n-m)!\}$. If the number of participating terminals and the number of simultaneously originating participating terminals, n, are large, this number of combinations is enormous. Also, in this case, if distribution tree calculation in which m streams are competing is performed repeatedly for all of these combinations, a considerable amount of time is required. Therefore, this embodiment, in which distribution tree calculation is limited to origination candidate terminals, enables the expanded distribution tree calculation time to be greatly shortened.

Also, in a communication network according to this embodiment, combinations of origination candidate terminals are limited to combinations of an instructor and one questioner, so that distribution tree calculation in which two streams are competing need only be repeated n−1 times at most. Therefore, a communication network comprising terminals 100 enables the expanded distribution tree calculation time to be further greatly shortened.

Moreover, in a communication network according to this embodiment, not all distribution trees with an origination candidate terminal as a root are decided, but only limited representative distribution trees from among these. Also, in a communication network according to this embodiment, a representative distribution tree is used by setting a connection tree path for an origination candidate terminal that does not correspond to a representative distribution tree root. By this means, in a communication network according to this embodiment, the data size of a transfer table can be reduced, and the time required for expanded distribution tree setting and the time required for data packet duplication and transfer can be shortened.

The operation of terminal 100 having the above configuration will now be described.

Figure 4:
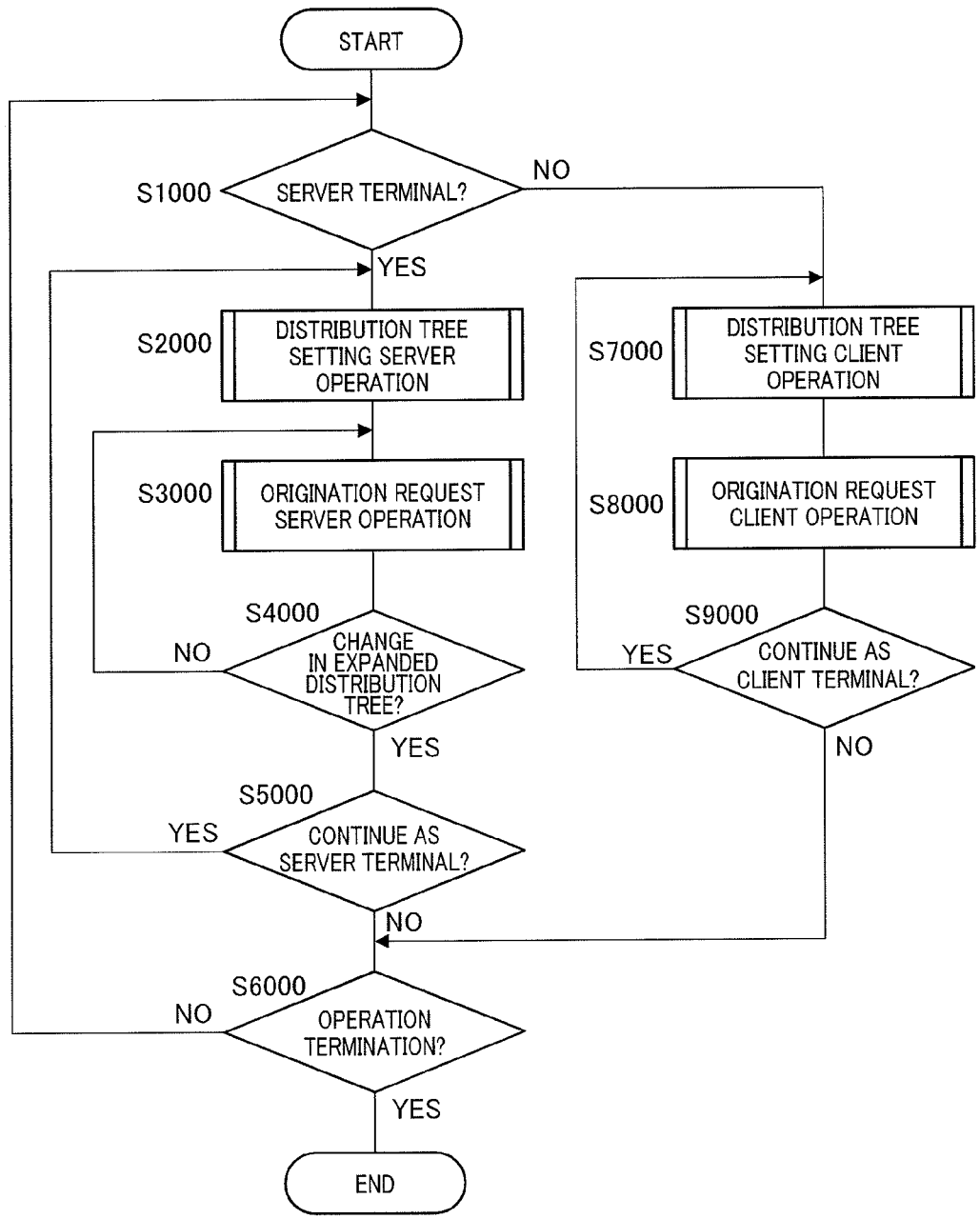
FIG. 4 is a flowchart showing an example of the overall operation of a terminal according to this embodiment.

FIG. 4 is a flowchart showing an example of the overall operation of terminal 100.

First, in step S1000, terminal 100 determines whether or not a function as a server terminal has been set.

If a function as a server terminal has been set (S1000: YES) terminal 100 executes distribution tree setting server operation and origination request server operation (S2000, S3000).

Then, if a function as a server terminal is to be continued without making a change in the set expanded distribution tree (S4000: NO), terminal 100 returns to step S3000. If the set expanded distribution tree is to be changed (S4000: YES, S5000: YES), terminal 100 returns to step S2000. If a function as a server terminal is not to be continued without making a change in the set expanded distribution tree (S4000: YES, S5000: NO), terminal 100 proceeds to step S6000.

On the other hand, if a function as a client terminal has been set (S1000: NO) terminal 100 executes distribution tree setting client operation and origination request client operation (S7000, S8000). Then, if a function as a client terminal is to be continued (S9000: YES), terminal 100 returns to step S7000. If a function as a client terminal is not to be continued (S9000: NO), terminal 100 proceeds to step S6000.

In step S6000, terminal 100 determines whether or not operation termination has been directed by means of directive input from the user or the like. If operation termination has not been directed (S6000: NO), terminal 100 returns to step S1000. On the other hand, if operation termination has been directed (S6000: YES), terminal 100 terminates the series of operations.

While performing the above operations, terminal 100 operates the function of data packet transmission/reception section 230 in parallel and performs received packet duplication and transfer processing in accordance with a transfer table. That is to say, terminal 100 perfoinis data packet duplication and transfer by means of ALM irrespective of which phase it is operating in.

First, distribution tree setting server operation will be described.

Figure 5:
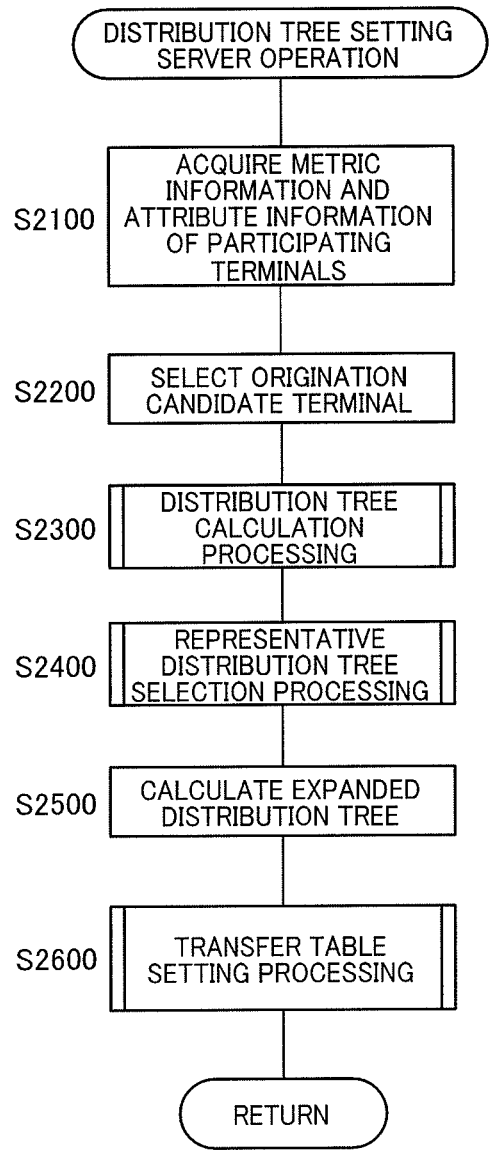
FIG. 5 is a flowchart showing an example of distribution tree setting server operation in this embodiment.

FIG. 5 is a flowchart showing an example of distribution tree setting server operation by terminal 100.

First, in step S2100, control server section 130 acquires the latest metric information of all participating terminals and a list of attribute information of all participating terminals, and outputs the acquired metric information to expanded distribution tree calculation section 140. More specifically, control server section 130 issues a directive to information collecting client section 120 of each participating terminal for measurement of delay times and available bands vis-a-vis all other participating terminals, and return of measurement results and attribute information. By this means, control server section 130 acquires metric information.

Participating terminal attribute information includes, for example, a participating terminal user attribute, IP address, installation area, and location in the communication network. Terminal 100 may store participating terminal attribute information beforehand, or may acquire participating terminal attribute information from an information server located in the communication network each time distribution tree setting server operation is performed. Terminal 100 may also acquire participating terminal attribute information from each participating terminal together with metric information in control server section 130.

Then, in step S2200, expanded distribution tree calculation section 140 selects an origination candidate terminal from participating terminals based on a list of acquired participating terminal attribute information.

An origination candidate terminal may be decided beforehand, or may be selected based on a user attribute. For example, expanded distribution tree calculation section 140 could select a participating terminal whose user attribute is teleconference speaker, speaker of another conference, origination group representative, or the like, as an origination candidate terminal. Also, expanded distribution tree calculation section 140 may preferentially select a participating terminal for which there were more origination requests, or a participating terminal for which the question stream transmission time was longer, in a past conference. Furthermore, expanded distribution tree calculation section 140 may divide a plurality of participating terminals into groups, measure the available band for each group, and preferentially select a participating terminal of a group with a larger available band.

Then, in step S2300, expanded distribution tree calculation section 140 executes distribution tree calculation processing. Distribution tree calculation processing is processing that calculates a distribution tree with an origination candidate terminal as its root. Details of this processing will be given later herein.

Here, it is assumed that there are a total of two persons who can perform origination simultaneously: a speaker and one of the other origination candidate terminal users. Therefore, distribution trees are calculated so that a distribution tree with the speaker as its root and a distribution tree with one of the origination candidate terminals as its root coexist.

Then, in step S2400, expanded distribution tree calculation section 140 executes representative distribution tree selection processing. Representative distribution tree selection processing is processing that selects a representative distribution tree from among calculated distribution trees. Details of this processing will be given later herein.

Then, in step S2500, expanded distribution tree calculation section 140 calculates an expanded distribution tree by combining a connection tree path with a representative distribution tree for all origination candidate terminals. Details of expanded distribution tree calculation will be given later herein. Expanded distribution tree calculation section 140 then outputs information indicating a calculated expanded distribution tree (hereinafter referred to simply as "expanded distribution tree") to table setting server section 150. Expanded distribution tree calculation section 140 also sets information mutually associating an origination candidate terminal and a distribution tree root terminal IP address for each expanded distribution tree to control server section 130 as root terminal information.

Then, in step S2600, table setting server section 150 executes transfer table setting processing, and terminates distribution tree setting server operation. Transfer table setting processing is processing that sets a transfer table in each participating terminal so that all input expanded distribution trees are implemented in the communication network. Details of this processing will be given later herein.

By means of such distribution tree setting server operation, terminal 100 can set expanded distribution trees corresponding to all origination candidate terminals for the communication network.

Figure 6:
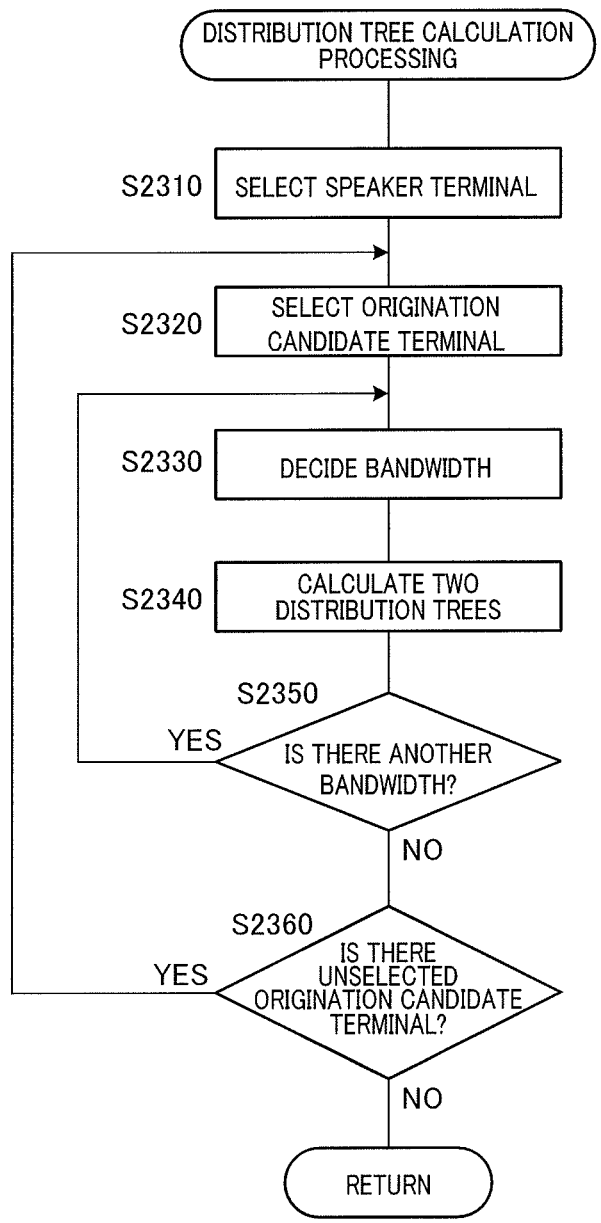
FIG. 6 is a flowchart showing an example of distribution tree calculation processing in this embodiment.

FIG. 6 is a flowchart showing an example of distribution tree calculation processing.

First, in step S2310, expanded distribution tree calculation section 140 selects a speaker's participating terminal (hereinafter referred to as "speaker terminal"). A speaker terminal may be decided beforehand, or may be selected based on a user attribute.

Then, in step S2320, expanded distribution tree calculation section 140 selects one origination candidate terminal from among origination candidate terminals other than the speaker terminal.

Then, in step S2330, expanded distribution tree calculation section 140 decides a bandwidth to be used by the selected origination candidate terminal. More specifically, for example, expanded distribution tree calculation section 140 calculates a maximum bandwidth that can be used by an origination candidate terminal for data packet distribution. Then expanded distribution tree calculation section 140 decides a bandwidth allowing distribution of audio/video of predetermined quality within the calculated maximum bandwidth.

Then, in step S2340, expanded distribution tree calculation section 140 uses metric information and the decided bandwidth to calculate two distribution trees that have the speaker terminal and the selected origination candidate terminal as roots respectively and share bandwidth while competing with each other. More specifically, for example, expanded distribution tree calculation section 140 first calculates a distribution tree that uses the decided bandwidth and has an origination candidate terminal as its root using a minimum spanning tree algorithm. Then expanded distribution tree calculation section 140 attempts calculation of a distribution tree having the speaker terminal as a root in a similar way based on the remainder of the bandwidth consumed by the calculated distribution tree.

Here, one condition for a distribution tree with a speaker terminal as its root is having a bandwidth that allows distribution of audio/video of predetermined quality. Therefore, if a bandwidth decided upon as a bandwidth to be used by an origination candidate terminal is too large, expanded distribution tree calculation section 140 determines that a distribution tree with the speaker terminal as its root cannot be calculated.

Then, in step S2350, expanded distribution tree calculation section 140 determines whether or not there is another bandwidth that should be investigated. If there is another bandwidth that should be investigated (S2350: YES), expanded distribution tree calculation section 140 returns to step S2330. A case in which there is another bandwidth that should be investigated is, for example, a case in which a distribution tree with the speaker terminal as its root cannot be calculated. Alternatively, a case in which there is another bandwidth that should be investigated is, for example, a case in which a distribution tree with the speaker terminal as its root can be calculated, but the balance between the origination candidate terminal bandwidth and speaker terminal bandwidth is poor. Expanded distribution tree calculation section 140 then decides upon a different bandwidth and repeats the processing.

Expanded distribution tree calculation section 140 may, for example decide in descending order of bandwidth size, and decrease the bandwidth little by little until two distribution trees are calculated. By this means, two coexisting distribution trees can be calculated while keeping the bandwidth used by the selected origination candidate terminal as large as possible.

If there is no other bandwidth that should be investigated (S2350: NO), expanded distribution tree calculation section 140 proceeds to step S2360.

In step S2360, expanded distribution tree calculation section 140 determines whether or not an unselected origination candidate terminal remains. If an unselected origination candidate terminal remains (S2360: YES), expanded distribution tree calculation section 140 returns to step S2320. Then, expanded distribution tree calculation section 140 selects an unselected origination candidate terminal remains and repeats the processes. If all origination candidate terminals have been selected and have undergone processing (S2360: NO), expanded distribution tree calculation section 140 terminates distribution tree calculation processing.

By means of such distribution tree calculation processing, terminal 100 can calculate distribution trees for all origination candidate terminals.

Figure 7:
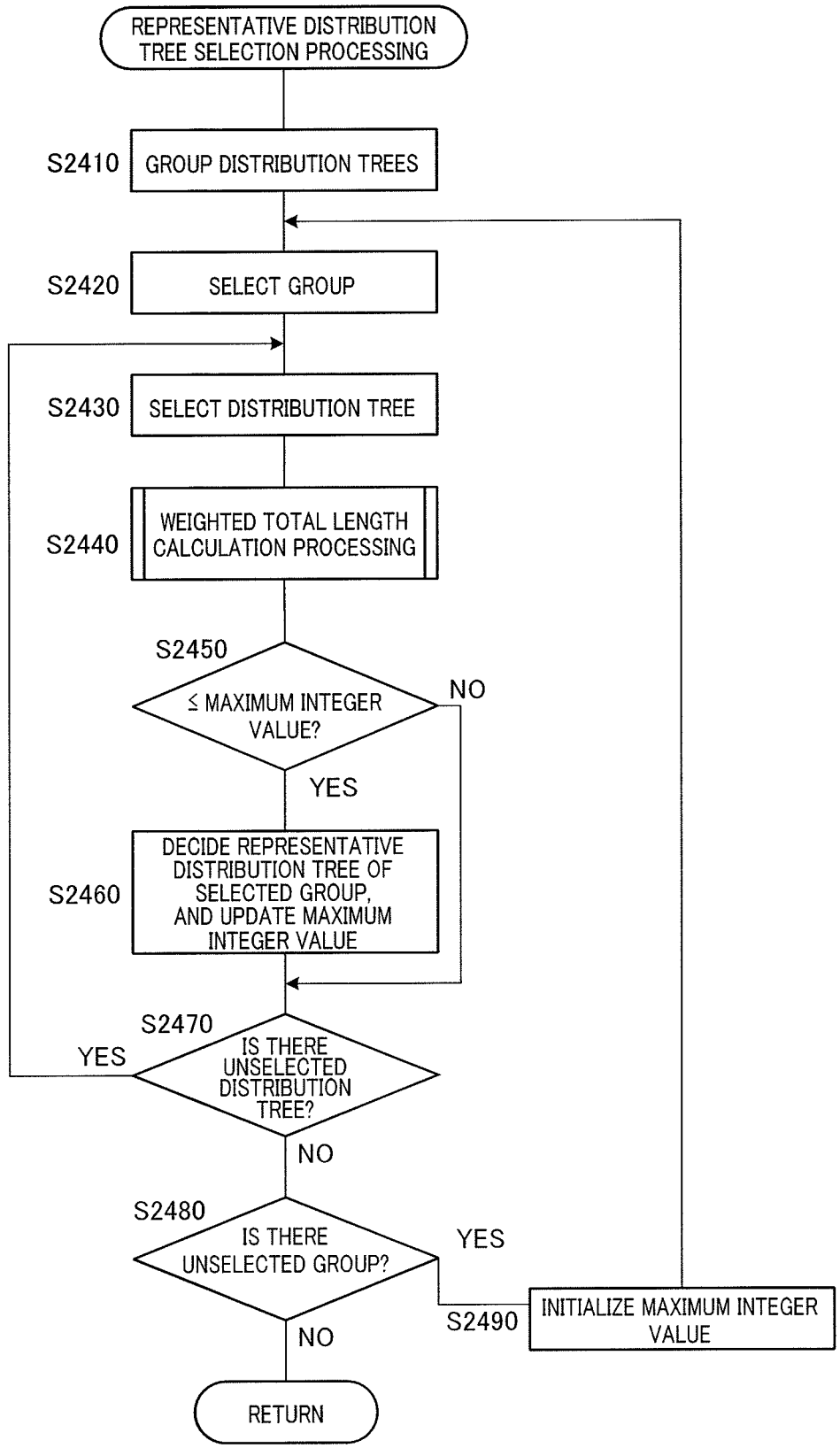
FIG. 7 is a flowchart showing an example of representative distribution tree selection processing in this embodiment.

FIG. 7 is a flowchart showing an example of representative distribution tree selection processing.

First, in step S2410, expanded distribution tree calculation section 140 groups calculated distribution trees based on root terminal location. This grouping is performed, for example, by dividing up the communication network so that bands and round trip times between origination candidate terminals within a group fall within a predetermined range. By this means, it is possible to secure a band and round trip time within a predetermined range for communication between all origination candidate terminals within a group and a root terminal within that group. That is to say, whichever origination candidate terminal becomes an originating terminal, a band and round trip time within a predetermined range can be secured for a connection tree path.

Then, in step S2420, expanded distribution tree calculation section 140 selects one group.

Then, in step S2430, expanded distribution tree calculation section 140 selects one of the distribution trees belonging to the selected group from among the calculated distribution trees.

Then, in step S2440, expanded distribution tree calculation section 140 executes weighted total length calculation processing on the selected distribution tree. Weighted total length calculation processing is processing that calculates a weighted total length for a selected distribution tree. A weighted total length is an evaluation value when weighting is performed on sections between neighboring participating terminals in a distribution tree in accordance with the band and round trip time of those sections. Details of this processing will be given later herein.

Then, in step S2450, expanded distribution tree calculation section 140 determines whether or not the calculated weighted total length is less than or equal to a predetermined maximum integer value. A maximum integer value is the maximum length of a weighted total length of a distribution tree that is not a hindrance to teleconferencing, and each time a distribution tree with a shorter weighted total length is discovered, the maximum integer value is updated with the weighted total length of that distribution tree. If the weighted total length is less than or equal to the maximum integer value (S2450: YES), expanded distribution tree calculation section 140 proceeds to step S2460, whereas if the weighted total length exceeds the maximum integer value (S2450: NO), expanded distribution tree calculation section 140 proceeds to step S2470.

In step S2460, expanded distribution tree calculation section 140 decides upon the selected distribution tree as a representative distribution tree of the selected group. If a representative distribution tree has already been decided for that group, expanded distribution tree calculation section 140 makes a new decision in favor of the selected distribution tree. Expanded distribution tree calculation section 140 also updates the maximum integer value with the weighted total length of the decided representative distribution tree.

Then, in step S2470, expanded distribution tree calculation section 140 determines whether or not an unselected distribution tree remains within the selected group. If an unselected distribution tree remains (S2470: YES), expanded distribution tree calculation section 140 returns to step S2430. Then expanded distribution tree calculation section 140 selects an unselected distribution tree and repeats the processing. On the other hand, if all distribution trees in the selected group have been selected and have undergone processing (S2470: NO), expanded distribution tree calculation section 140 proceeds to step S2480.

In step S2480, expanded distribution tree calculation section 140 determines whether or not an unselected group remains. If an unselected group remains (S2480: YES), expanded distribution tree calculation section 140 proceeds to step S2490.

In step S2490, expanded distribution tree calculation section 140 restores the maximum integer value to its initial value. Then expanded distribution tree calculation section 140 returns to step S2420, selects an unselected group, and repeats the processing.

When all groups have been selected and have undergone processing by means of the processing in step S2420 through step S2490 (S2480: NO), expanded distribution tree calculation section 140 terminates representative distribution tree selection processing.

By means of such representative distribution tree selection processing, terminal 100 can select a distribution tree with the shortest weighted total length as a representative distribution tree for each group. Also, whichever origination requesting terminal becomes an originating terminal, terminal 100 can select a distribution tree that enables the total length of an expanded distribution tree to be suppressed as a representative distribution tree.

Figure 8:
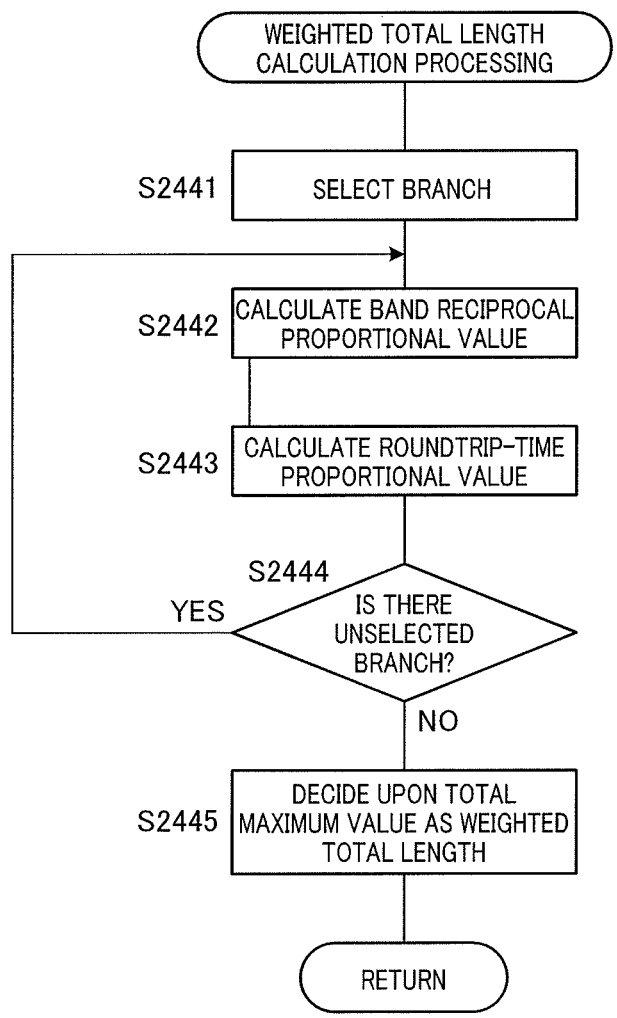
FIG. 8 is a flowchart showing an example of weighted total length calculation processing in this embodiment.

FIG. 8 is a flowchart showing an example of weighted total length calculation processing.

First, in step S2441, expanded distribution tree calculation section 140 selects one of the branches configuring a selected distribution tree. Here, a branch is a section from a root to a last participating terminal.

Then, in step S2442, expanded distribution tree calculation section 140 calculates a band-reciprocal proportional value of a selected branch. A band-reciprocal proportional value is a value proportional to the reciprocal of a band measured value of a branch—for example, a value obtained by dividing positive integer a by a band coefficient value of a branch.

Then, in step S2443, expanded distribution tree calculation section 140 calculates a roundtrip-time proportional value of a selected branch. A roundtrip-time proportional value is a value proportional to a round trip time (delay time) measured value of a branch—for example, a value obtained by multiplying positive integer β by a round trip time measured value of a branch.

Then, in step S2444, expanded distribution tree calculation section 140 determines whether or not an unselected branch remains. If an unselected branch remains (S2444: YES), expanded distribution tree calculation section 140 returns to step S2441, selects an unselected branch and repeats the processing. On the other hand, if all branches have been selected and have undergone processing (S2444: NO), expanded distribution tree calculation section 140 proceeds to step S2445.

In step S2445, expanded distribution tree calculation section 140 decides upon the maximum value among the total of band-reciprocal proportional values and roundtrip-time proportional values calculated for each branch as a weighted total length of the selected distribution tree, and terminates weighted total length calculation processing.

By means of such weighted total length calculation processing, terminal 100 can calculate a weighted total length of each distribution tree.

When representative distribution trees of each group have been selected, expanded distribution tree calculation section 140 calculates an expanded distribution tree as described above (step S2500 in FIG. 5). More specifically, expanded distribution tree calculation section 140 calculates the shortest path to root terminals grouped in the same group by representative distribution tree selection processing for each origination candidate terminal. Then expanded distribution tree calculation section 140 decides upon the calculation result as a connection tree path of that origination candidate terminal. Expanded distribution tree calculation section 140 then calculates a distribution path from a connection tree path to a representative distribution tree as an expanded distribution tree for each origination candidate terminal that is not a root terminal. An expanded distribution tree is a collection of link information indicating which other participating terminal each terminal transfers a data packet to.

Figure 9:
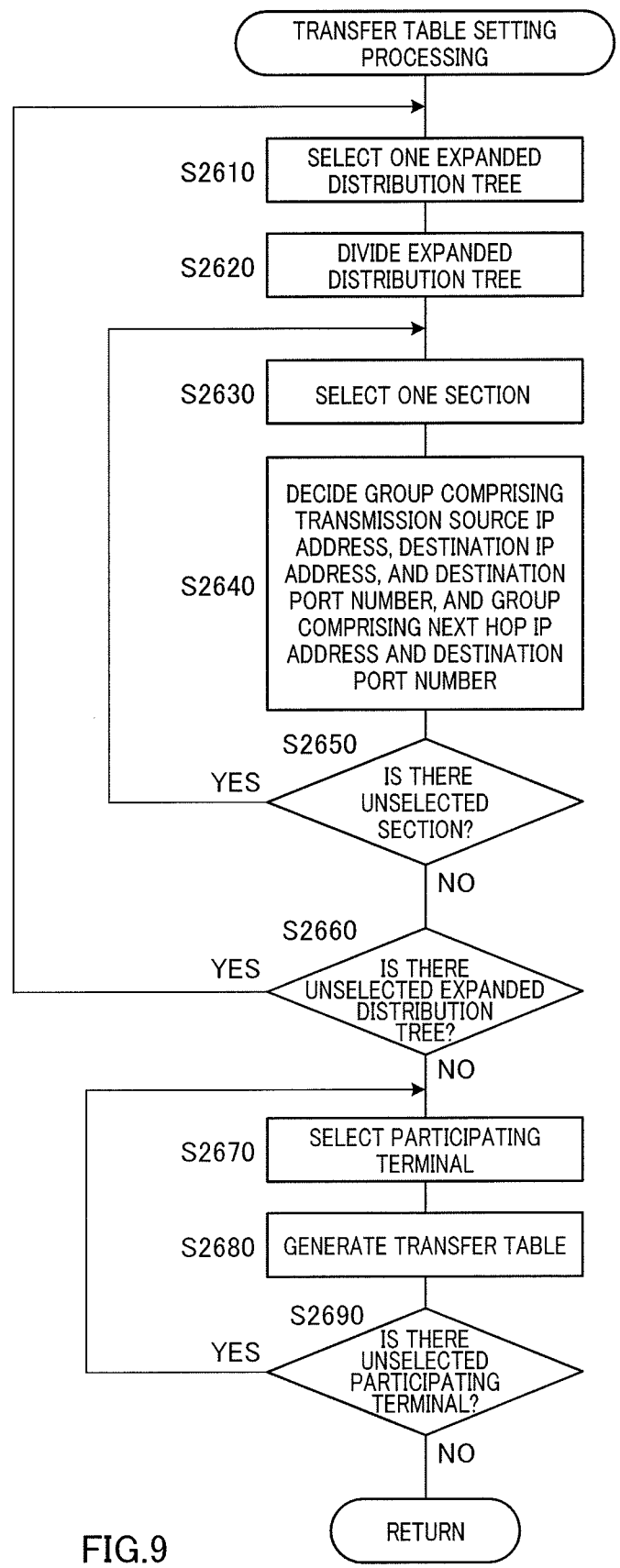
FIG. 9 is a flowchart showing an example of transfer table setting processing in this embodiment.

FIG. 9 is a flowchart showing an example of transfer table setting processing.

First, in step S2610, table setting server section 150 selects one of the input expanded distribution trees.

Then, in step S2620, table setting server section 150 divides link information configuring an expanded distribution tree for each input expanded distribution tree. Information that is divided is originating terminal link information, link information of a participating terminal on a connection tree path, root terminal link information, and link information of a participating terminal on a distribution tree. Below, a collection of divided link information is referred to as a "section."

Then, in step S2630, table setting server section 150 selects one section.

Then, in step S2640, table setting server section 150 decides a group comprising a transmission source IP address, destination IP address, and destination port number, and a group comprising the next hop IP address and destination port number, for the selected section. More specifically, table setting server section 150 decides group information so that a data packet is transferred in accordance with a distribution tree. Also, table setting server section 150 decides these sets of group information so that reassignment of a data packet destination port number (from a connection tree port number to a distribution tree port number) is performed in a root terminal.

Then, in step S2650, table setting server section 150 determines whether or not an unselected section remains. If an unselected section remains (S2650: YES), table setting server section 150 returns to step S2630. Then table setting server section 150 selects an unselected section and repeats the processing. If all sections have been selected and have undergone processing—that is, if processing has been completed for all expanded distribution trees—(S2650: NO), table setting server section 150 proceeds to step S2660.

In step S2660, table setting server section 150 determines whether or not an unselected expanded distribution tree remains. If an unselected expanded distribution tree remains (S2660: YES), table setting server section 150 returns to step S2610. Then table setting server section 150 selects an unselected expanded distribution tree and repeats the processing. If all expanded distribution trees have been selected and have undergone processing—that is, if processing has been completed for all expanded distribution trees—(S2660: NO), table setting server section 150 proceeds to step S2670.

In step S2670, table setting server section 150 selects one participating terminal.

Then, in step S2680, table setting server section 150 collects together information decided for the selected participating terminal and generates a transfer table. Table setting server section 150 then transmits the generated transfer table to the selected participating terminal.

Then, in step S2690, table setting server section 150 determines whether or not an unselected participating terminal remains. If an unselected participating terminal remains (S2690: YES), table setting server section 150 returns to step S2670. Then table setting server section 150 selects an unselected participating terminal and repeats the processing. If all participating terminals have been selected and have undergone processing (S2690: NO), table setting server section 150 tem inates transfer table setting processing.

By means of such transfer table setting processing, terminal 100 can set a transfer table for each participating terminal so that all calculated expanded distribution trees are implemented in the communication network.

The distribution tree setting client operation in step S7000 in FIG. 4 will now be described.

Figure 10:
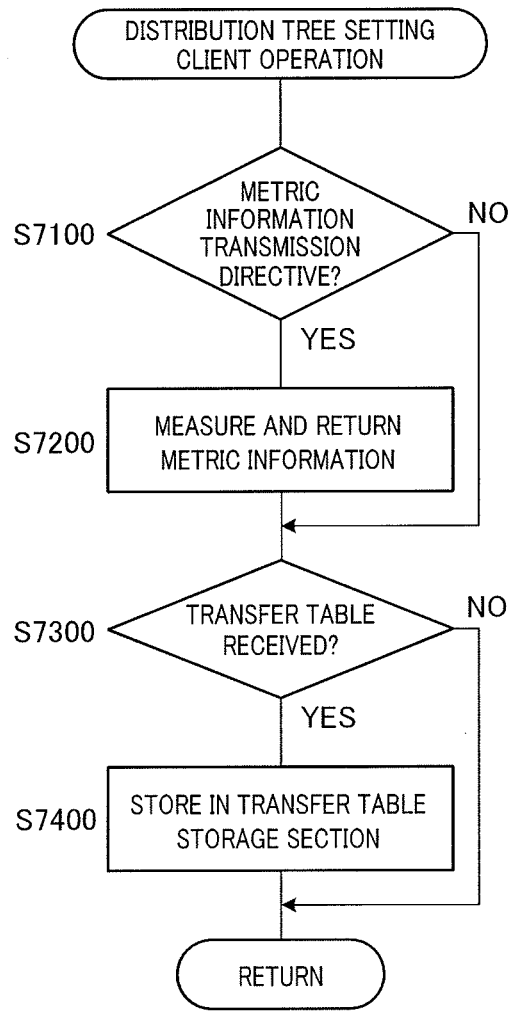
FIG. 10 is a flowchart showing an example of distribution tree setting client operation in this embodiment.

FIG. 10 is a flowchart showing an example of distribution tree setting client operation.

First, in step S7100, information collecting client section 120 determines whether or not there is a metric information transmission directive from a server terminal. If there is a directive (S7100: YES), information collecting client section 120 proceeds to step S7200, whereas if there is no directive (S7100: NO), information collecting client section 120 proceeds to step S7300 described later herein.

In step S7200, information collecting client section 120 performs full-mesh measurement of metric information, and returns the measurement results to the server terminal.

Then, in step S7300, table setting client section 160 shifts to a state of waiting for reception of a transfer table from the server terminal. As described above, this transfer table has contents corresponding to all expanded distribution trees calculated by the server terminal. If a transfer table has been received (S7300: YES), table setting client section 160 proceeds to step S7400, whereas if a transfer table has not been received (S7300: NO), table setting client section 160 terminates distribution tree setting client processing.

In step S7400, table setting client section 160 stores a received transfer table in transfer table storage section 170 described later herein. Alternatively, table setting client section 160 updates a transfer table already stored in transfer table storage section 170 with a transfer table received from control server section 130. Then terminal 100 terminates distribution tree setting client operation.

By means of such distribution tree setting client operation, terminal 100 can receive an expanded distribution tree setting from a server terminal.

The origination request client operation in step S8000 in FIG. 4 will now be described.

Figure 11:
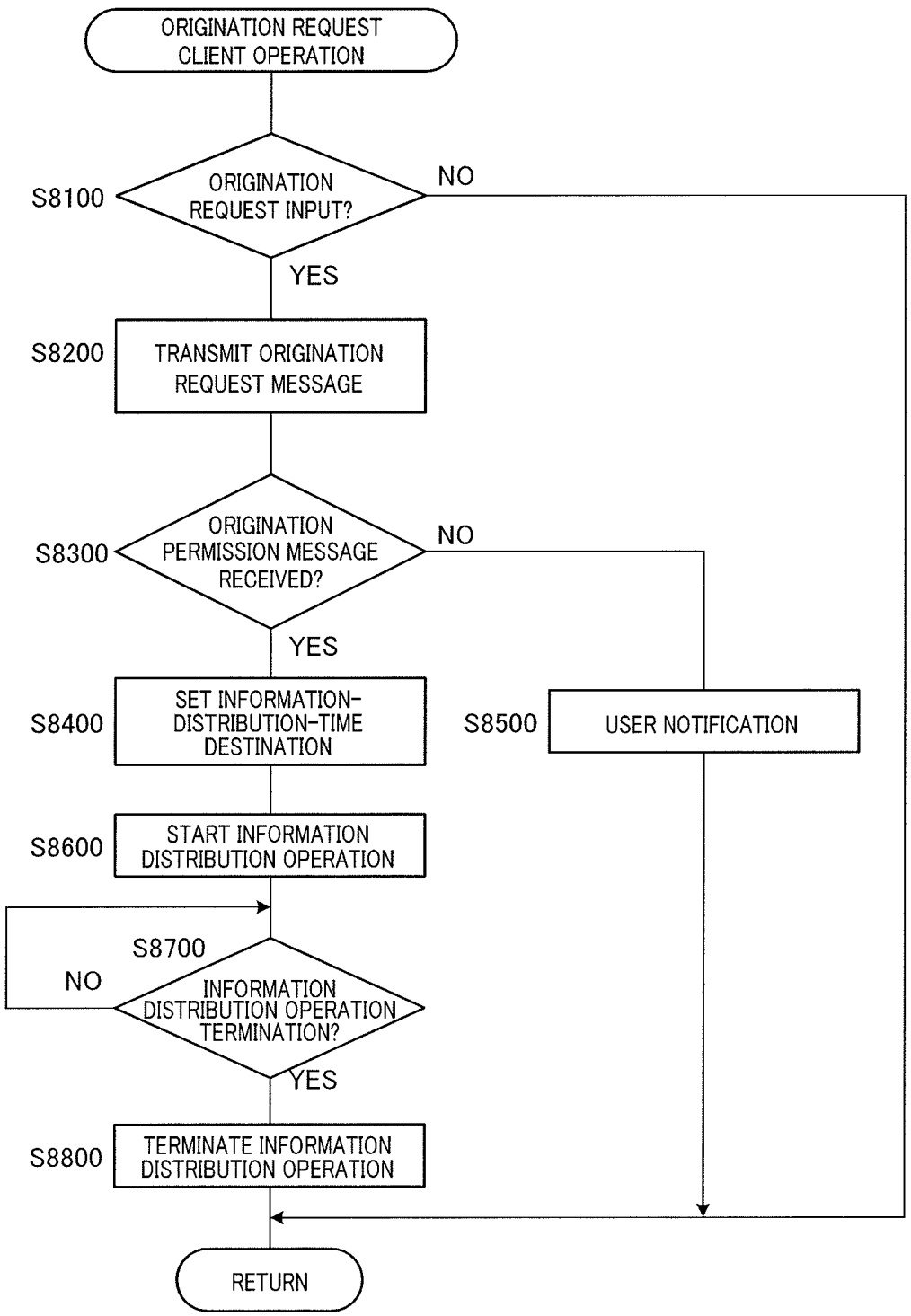
FIG. 11 is a flowchart showing an example of origination request client operation in this embodiment.

FIG. 11 is a flowchart showing an example of origination request client operation.

First, in step S8100, conference client section 210 determines whether or not an origination request has been input to origination right application UI section 180 from a user. If an origination request has been input (S8100: YES), conference client section 210 proceeds to step S8200. On the other hand, if an origination request has not been input (S8100: NO), conference client section 210 terminates origination request client operation.

In step S8200, conference client section 210 generates an origination request message, and transmits the generated origination request message to the server terminal.

Then, in step S8300, after transmitting the origination request message to the server terminal, conference client section 210 sets a timer (not shown in FIG. 2). Conference client section 210 then determines whether or not an origination permission message is received before a timeout occurs. If an origination permission message is received before a timeout occurs (S8300: YES), conference client section 210 proceeds to step S8400. On the other hand, if a timeout occurs without an origination permission message being received, or an origination non-permission message is received (S8300: NO), conference client section 210 proceeds to step S8500.

In step S8400, conference client section 210 sets a root terminal IP address included in the received origination permission message in code generation section 220 as an information-distribution-time destination.

Then, in step S8600, conference client section 210 starts information distribution operation. That is to say, conference control UI section 200 starts user audio/video input, and conference client section 210 starts audio/video transfer from conference control UI section 200 to code generation section 220. As described above, contents corresponding to an expanded distribution tree when terminal 100 becomes an originating terminal are also set in a transfer table used by data packet transmission/reception section 230. Therefore, audio/video input to terminal 100 is distributed to each participating terminal with a delay time that is not a hindrance to teleconferencing.

Then, in step S8700, conference client section 210 repeats determination of whether or not termination of information distribution operation has been directed by means of a control signal from the server terminal, user directive input, or the like. If termination of information distribution operation has been directed (S8700: YES), conference client section 210 proceeds to step S8800.

In step S8800, conference client section 210 terminates information distribution operation, and terminates origination request client operation. That is to say, conference client section 210 clears a code generation section 220 information-distribution-time destination setting, and stops transfer between conference control UI section 200 and code generation section 220.

On the other hand, in step S8500, conference client section 210 notifies the user that the origination request has not been approved, and terminates origination request client operation. This notification is given by means of a message display on a display screen or buzzer audio output, for example.

By means of such origination request client operation, terminal 100 can issue an origination request to a server terminal, and can distribute user audio/video to each participating terminal in virtually real time.

The origination request server operation in step S3000 in FIG. 4 will now be described.

Figure 12:
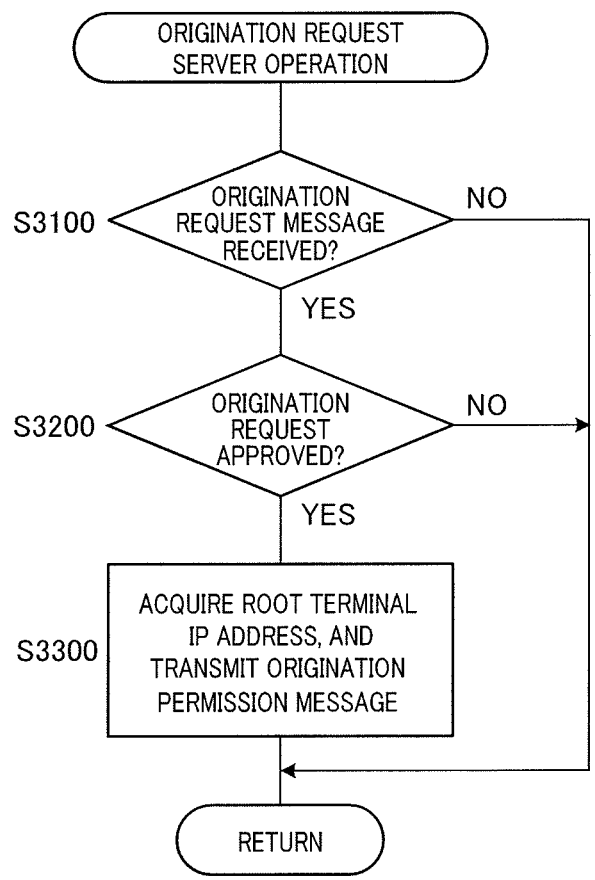
FIG. 12 is a flowchart showing an example of origination request server operation in this embodiment.

FIG. 12 is a flowchart showing an example of terminal 100 origination request server operation.

First, in step S3100, control server section 130 determines whether or not an origination request message has been received from a client terminal. If an origination request message has been received (S3100: YES), control server section 130 reports the fact to origination right permission UI section 190, and proceeds to step S3200. On the other hand, if an origination request message has not been received (S3100: NO), control server section 130 terminates origination request server operation.

In step S3200, control server section 130 determines whether or not an origination request has been approved by a user in origination right permission UI section 190. If an origination request has been approved (S3200: YES), control server section 130 proceeds to step S3300. On the other hand, if an origination request has not been approved (S3200: NO), control server section 130 terminates origination request server operation.

In step S3300, control server section 130 acquires an IP address of a root terminal associated with the origination requesting terminal This root terminal is a root terminal of a distribution tree used by the origination requesting terminal. Then control server section 130 generates an origination permission message that includes the acquired IP address. Control server section 130 then transmits the generated origination permission message to the origination requesting terminal, and terminates origination request server operation.

By means of such distribution tree setting client operation, terminal 100 can report an IP address of a participating terminal that should be a data packet transmission destination to a client terminal, and can permit audio/video distribution.

Signal flow between a server terminal and client terminal implemented by means of the above operation will now be described.

Figure 13:
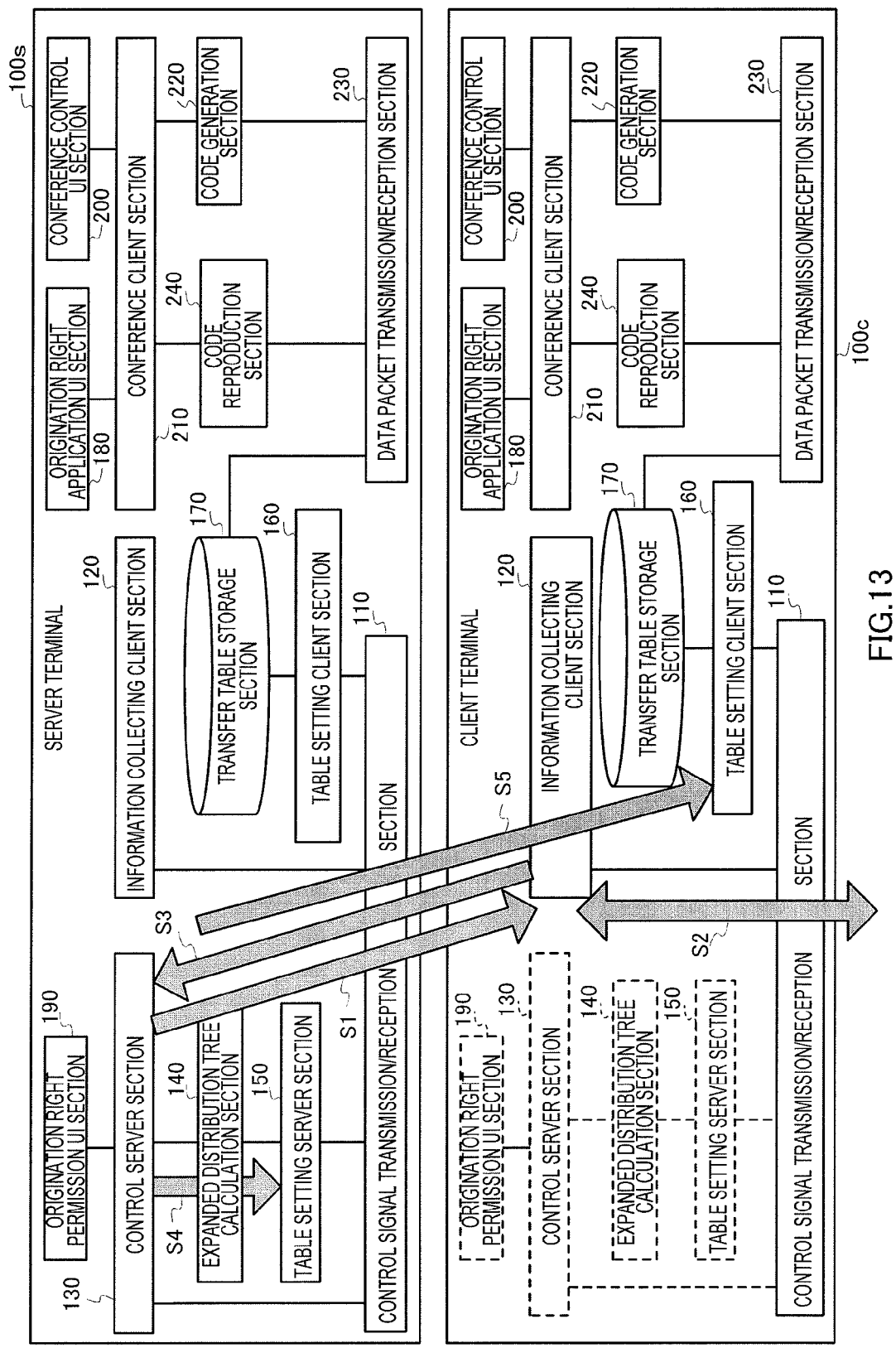
FIG. 13 is a drawing showing an overview of signal flow in a phase of setting a distribution tree in this embodiment.

FIG. 13 is a drawing showing an overview of signal flow between a server terminal and client terminal in a phase of setting a distribution tree.

Server terminal 100s differs from client terminal 100c in that the functions of control server section 130, expanded distribution tree calculation section 140, table setting server section 150, and origination right permission UI section 190 have been activated. Here, these function blocks in client terminal 100c are indicated by dotted lines. On the other hand, client function blocks such as table setting client section 160 have also been activated in server terminal 100s. The reason for this is that, since server terminal 100s also performs data packet duplication and transfer, it is necessary for distribution tree setting to be performed for server terminal 100s itself.

First, upon ascertaining the IP addresses of all participating terminals, control server section 130 of server terminal 100s directs information collecting client section 120 of client terminal 100c to measure bands and round trip times between other participating terminals (S1). On receiving this directive, information collecting client section 120 of client terminal 100c measures bands and round trip times between other participating terminals (S2). Then information collecting client section 120 reports the measurement results to control server section 130 of server terminal 100s as metric information (S3).

Expanded distribution tree calculation section 140 of server terminal 100s calculates an expanded distribution tree for each origination candidate terminal based on metric information received from control server section 130, and passes the calculation results to table setting server section 150 (S4). Table setting server section 150 of server terminal 100s converts a received expanded distribution tree to a client terminal 100c transfer table, and transmits that transfer table to table setting client section 160 of client terminal 100c (S5). Table setting client section 160 of client terminal 100c sets the transmitted transfer table in transfer table storage section 170.

Figure 14:
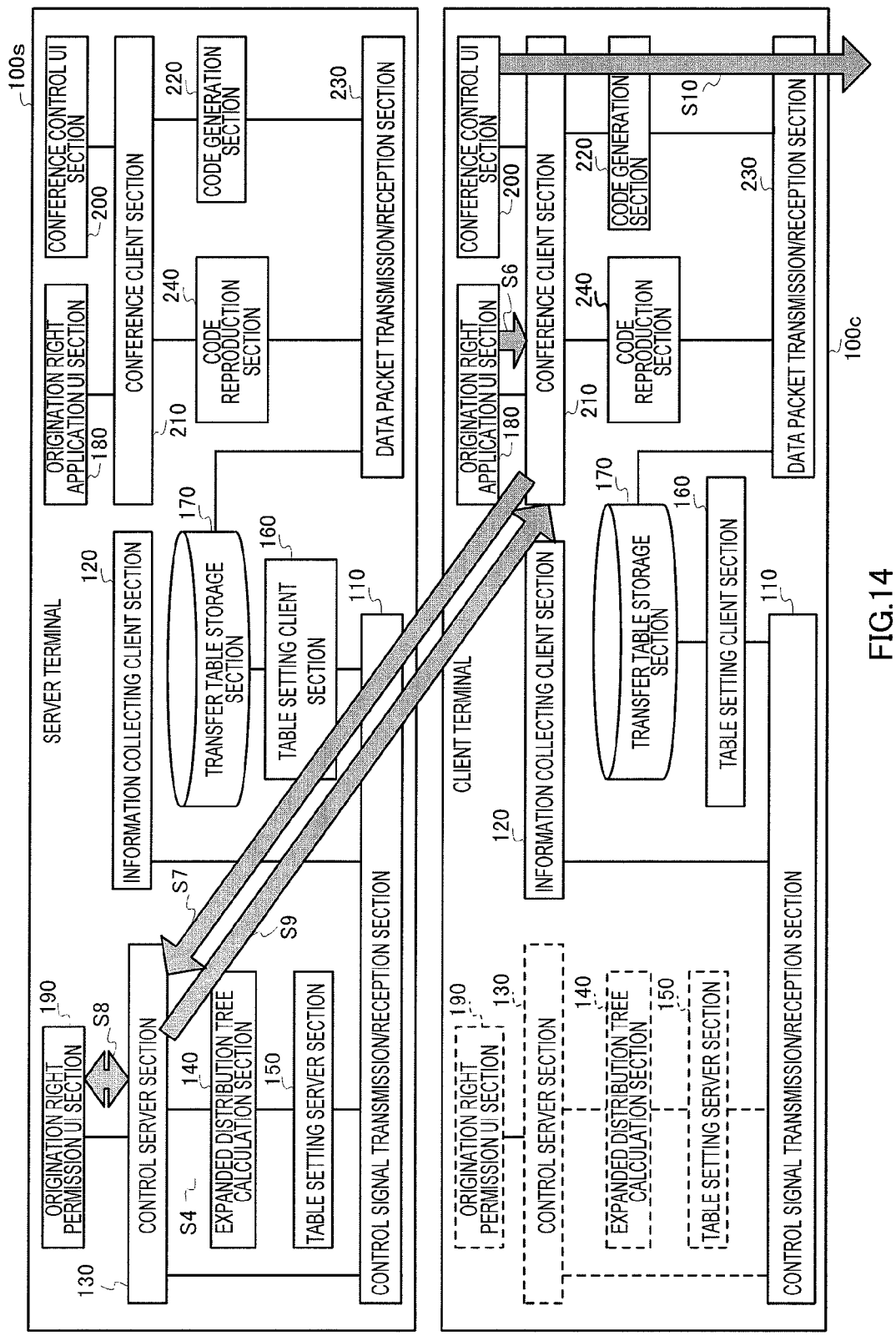
FIG. 14 is a drawing showing an overview of signal flow in a phase of issuing an origination request in this embodiment.

FIG. 14 is a drawing showing an overview of signal flow between a server terminal and client terminal in a phase of issuing an origination request.

As shown in FIG. 14, first, when an origination request is input from a user, origination right application UI section 180 of client terminal 100c reports the fact to conference client section 210 (S6). On receiving this report, conference client section 210 transmits an origination request message to control server section 130 of server terminal 100s (S7).

In server terminal 100s, control server section 130 identifies client terminal 100c by means of an origination request message transmission source IP address, and prompts the user to make a decision as to whether or not the origination request is to be approved via origination right permission UI section 190 (S8). Then, when it is decided that the origination request is to be approved, control server section 130 transmits an origination permission message to conference client section 210 of client terminal 100c (S9). Conference client section 210 of client terminal 100c directs code generation section 220 to generate encoded data making a root terminal IP address and connection tree port number a destination. As a result, client terminal 100c becomes an originating terminal, and audio/video input by conference control UT section 200 is distributed to another participating terminal (S10).

What should be noted here is that originating terminal switching is completed simply by reporting of a root terminal IP address port number from server terminal 100s to client terminal 100c. That is to say, originating terminal switching is performed without distribution tree calculation or setting being necessary.

Brief actual examples of distribution paths implemented by means of the above operations will now be described.

Figure 15:
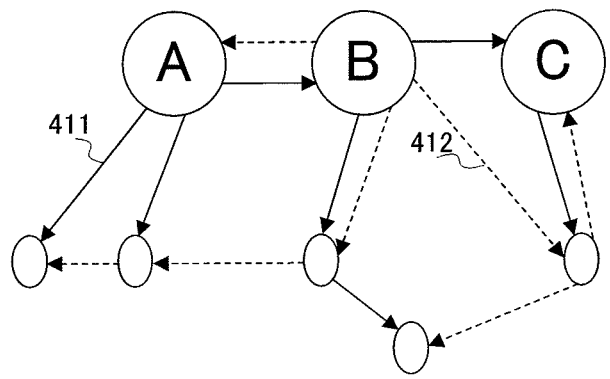
FIG. 15 is a schematic diagram showing a sample configuration of a representative distribution tree in this embodiment.

FIG. 15 is a schematic diagram showing a sample configuration of a representative distribution tree.

As shown in FIG. 15, it is assumed that representative distribution tree 411 (indicated by solid lines in the drawing) with terminal A as a root terminal, and representative distribution tree 412 (indicated by dotted lines in the drawing) with terminal B as a root terminal, have been set. It is also assumed that terminal C that is not a root terminal is located close to terminal B.

Figure 16:
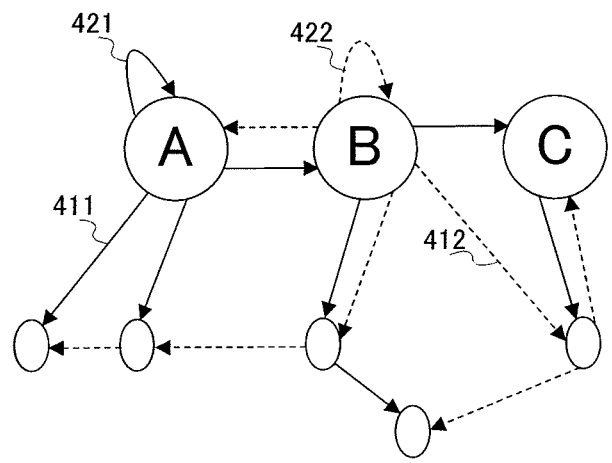
FIG. 16 is a schematic diagram showing an example of a distribution path when an originating terminal is a root terminal in this embodiment.

FIG. 16 is a schematic diagram showing an example of a distribution path when terminal A and terminal B that are both root terminals are originating terminals.

As shown in FIG. 16, when terminal A is an originating terminal, terminal A expanded distribution tree connection tree path 421 (indicated by a solid line in the drawing) is set so as to return from terminal A to terminal A itself. As a result, terminal A audio/video is distributed to each participating terminal by means of representative distribution tree 411 with terminal A as a root terminal. Similarly, when terminal B is an originating terminal, terminal B expanded distribution tree connection tree path 422 (indicated by a dotted line in the drawing) is set so as to return from terminal B to terminal B itself. As a result, terminal B audio/video is distributed to each participating terminal by means of representative distribution tree 412 with terminal B as a root terminal.

Figure 17:
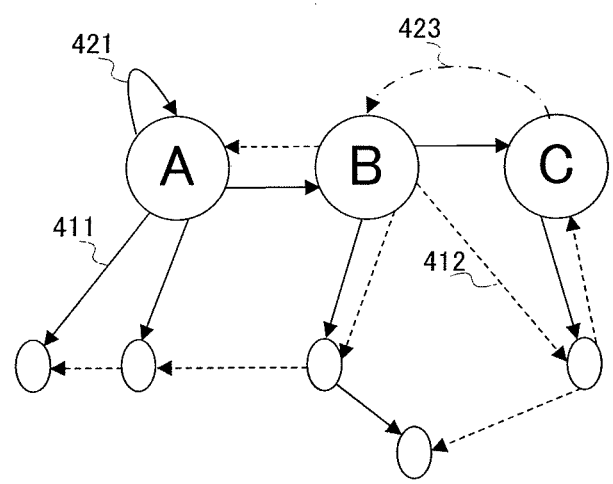
FIG. 17 is a schematic diagram showing an example of a distribution path when an originating terminal is not a root terminal in this embodiment.

FIG. 17 is a schematic diagram showing an example of a distribution path when terminal A that is a root terminal and terminal C that is not a root terminal are originating terminals.

As shown in FIG. 17, when terminal C is an originating terminal, terminal C expanded distribution tree connection tree path 423 (indicated by a dash-dot line in the drawing) is set so as to extend from terminal C to terminal B, for example. As a result, terminal C audio/video is distributed by means of representative distribution tree 412 with terminal B as a root terminal. That is to say, representative distribution tree 412 is used as a representative distribution tree for distributing terminal C audio/video.

Thus, even when not a representative distribution tree root terminal, each origination candidate terminal can perform audio/video origination using another origination candidate terminal being a root terminal.

As described above, according to this embodiment, distribution in accordance with an expanded distribution tree becomes possible by indicating a data packet transmission destination IP address (and destination port number) to an origination candidate terminal. By this means, in a communication network according to this embodiment, distribution path setting when an originating terminal is switched can be performed in a shorter time. Therefore, in a communication network according to this embodiment, a questioner can be switched at high speed, enabling a questioner to perform origination promptly. Also, an origination situation can be promptly distributed to other participating terminals. By this means, a communication network according to this embodiment enables a teleconference to proceed smoothly.

In this embodiment, a case has been described in which distribution tree and connection tree path settings are made simultaneously as an expanded distribution tree setting, but the present invention is not limited to this. Provision may also be made for a server terminal, for example, to calculate a connection tree path later and set this for each participating terminal. This makes it possible to handle communication network fluctuations and origination candidate terminal fluctuations in a flexible manner while performing originating terminal switching at high speed.

Also, when an origination right is switched to another originating participating terminal, it is desirable for the origination right of the previous originating terminal to be canceled. In this case, for example, the server terminal directs a root terminal used by a pre-switchover originating terminal to stop transfer of data packets sent from that originating terminal. On the other hand, the server terminal directs a root terminal used by a post-switchover originating terminal to start transfer of data packets sent from that originating terminal. These directives may be implemented, for example, by rewriting a transfer table corresponding to a root terminal.

In this embodiment, terminals in a communication network for conducting teleconferencing have been described, but application of the present invention is not limited to this case. The present invention can be applied to various kinds of apparatuses that set a distribution path for a communication network that distributes the same information from an unspecified terminal to a plurality of terminals. For example, the present invention may also be applied to an application whereby a representative distribution tree is set up beforehand for nationwide television terminals, and in the event of an earthquake or similar disaster, video from a camera in the vicinity of the disaster area is transmitted to the root terminal of the representative distribution tree.

The disclosure of Japanese Patent Application No. 2009-125840, filed on May 25, 2009, including the specification, drawings and abstract, is incorporated herein by reference in its entirety.

INDUSTRIAL APPLICABILITY

A path setting apparatus and path setting method according to the present invention are suitable for use as a path setting apparatus and path setting method that enable a packet distribution path to be set in a shorter time when an information transmission source is switched.

REFERENCE SIGNS LIST

100 Terminal
110 Control signal transmission/reception section
120 Information collecting client section
130 Control server section
140 Expanded distribution tree calculation section
150 Table setting server section
160 Table setting client section
170 Transfer table storage section
180 Origination right application UI section
190 Origination right permission UI section
200 Conference control UI section
210 Conference client section
220 Code generation section
230 Data packet transmission/reception section
240 Code reproduction section

The invention claimed is:

1. A path setting apparatus that sets a packet distribution path for a communication network that distributes information from an unspecified terminal to a plurality of terminals by means of packet transfer, the path setting apparatus comprising:
a distribution path calculation section that calculates the distribution path according to a location in the communication network of an origination candidate terminal that is a terminal capable of originating the information; and
a path setting section that sets the calculated distribution path in the communication network,
wherein the distribution path calculated by the distribution path calculation section is composed of a distribution tree that transfers the packet from the terminal being a root to the plurality of terminals, and a connection tree path that transfers the packet from the origination candidate terminal to the terminal being the root.

2. The path setting apparatus according to claim 1, further comprising an origination permission section that decides whether or not origination of the information is to be permitted for the origination candidate terminal,
wherein the path setting section sets at least two distribution trees in the communication network beforehand, and, when the information origination has been permitted for the origination candidate terminal, sets the connection tree path from that origination candidate terminal to one of the distribution tree paths in the communication network.

3. The path setting apparatus according to claim 2, wherein the path setting section sets the connection tree path in the communication network by reporting the terminal being the root of the distribution tree to the origination candidate terminal for which the information origination has been permitted.

4. The path setting apparatus according to claim 3, wherein:
the communication network is an Internet protocol network; and
the path setting section sets the transfer table corresponding to the distribution path composed of the distribution tree and the connection tree path which the distribution path calculation section has decided to set in the communication network in the corresponding terminal.

5. The path setting apparatus according to claim 4, wherein the distribution path calculation section decides preferentially upon the distribution tree whose total length is shorter among the distribution trees as the distribution tree that is set in the communication network.

6. The path setting apparatus according to claim 5, wherein, for each group of the distribution tree for which setting in the network has been decided and the terminal capable of issuing the origination request, the distribution path calculation section decides preferentially, from among paths from the terminal capable of issuing the origination request to the terminal being the root of the distribution tree, upon the path whose total length is shorter as the connection tree path that is set in the communication network.

7. The path setting apparatus according to claim 6, wherein the total length is a length when weighting is performed on each part of the distribution tree according to a band and round trip time of that part.

8. The path setting apparatus according to claim 7, wherein the band and the round trip time are a band and a round trip time when there are a plurality of the terminals capable of issuing the origination request and the information is distributed simultaneously from a plurality of corresponding terminals.

9. A path setting method that sets a packet distribution path for a communication network that distributes information from an unspecified terminal to a plurality of terminals by means of packet transfer, the path setting method comprising:
a step of calculating the distribution path according to a location in the communication network of an origination candidate terminal that is the terminal capable of originating the information; and
a step of setting calculated the distribution path in the communication network,
wherein the distribution path is composed of a distribution tree that transfers the packet from the terminal being a root to the plurality of terminals, and a connection tree path that transfers the packet from the origination candidate terminal to the terminal being the root.

* * * * *